United States Patent [19]

Spademan

[11] 4,360,979
[45] Nov. 30, 1982

[54] SPORT SHOE WITH A DYNAMIC ADJUSTABLE CUFF ASSEMBLY

[76] Inventor: Richard G. Spademan, Box 6410, Incline Village, Nev. 89450

[21] Appl. No.: 109,611

[22] Filed: Jan. 4, 1980

Related U.S. Application Data

[63] Continuation-in-part of Ser. No. 886,946, Mar. 15, 1978, and Ser. No. 50,436, Jun. 20, 1979.

[51] Int. Cl.³ .......................... A43B 5/04; A43B 11/00
[52] U.S. Cl. ............................................ 36/121; 36/50
[58] Field of Search ................. 36/117, 118, 119, 120, 36/121, 50

[56] References Cited

U.S. PATENT DOCUMENTS

| | | | |
|---|---|---|---|
| 3,313,046 | 4/1967 | Werner et al. | 36/121 |
| 3,793,749 | 2/1974 | Gertsch et al. | 36/121 |
| 4,083,129 | 4/1978 | Collombin et al. | 36/117 |
| 4,190,970 | 3/1980 | Annovi | 36/117 |

*Primary Examiner*—Patrick D. Lawson
*Attorney, Agent, or Firm*—Townsend and Townsend

[57] ABSTRACT

A sport shoe (1,30,50) is described provided with a cuff means (3,52) and means (17,57,58,70,71) responsive to forward lean coupled to said cuff means (3,52) for tightening said cuff means (3,52) about a leg enclosed thereby. In one embodiment the tightening means (17) is coupled to a cuff-mounted buckle means (10,31) for pulling cuff flap means (4,5) together with forward lean of the cuff means (5). In another embodiment a tongue member (53), in cooperation with the tightening means (57,58,70,71) pulls the cuff means (55,56) together with forward lean. In all of the embodiments forward and rearward lean dynamically adjust the fit of the cuff means (3,52) with respect to a leg enclosed thereby.

19 Claims, 15 Drawing Figures

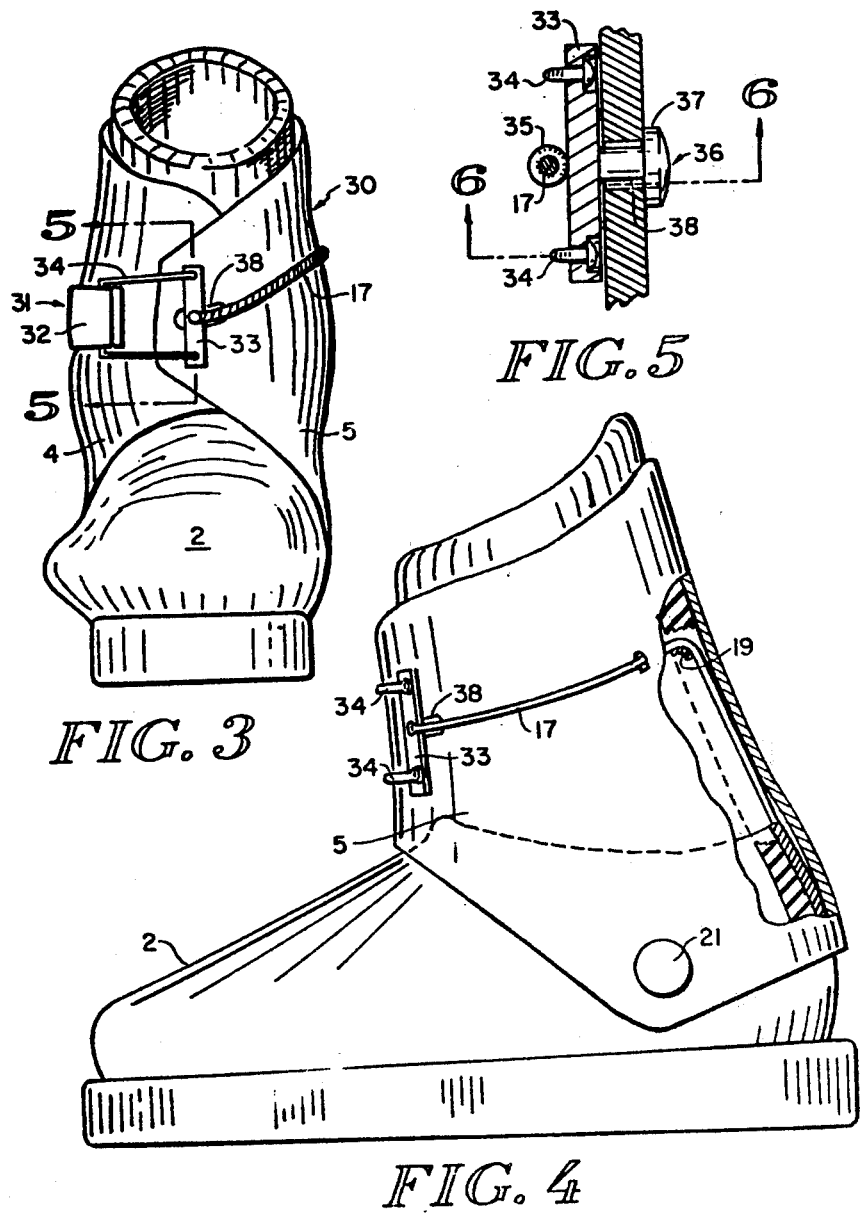

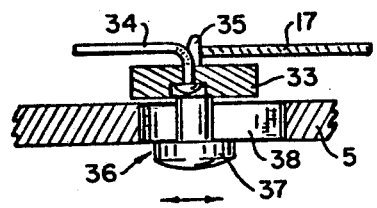
FIG. 6
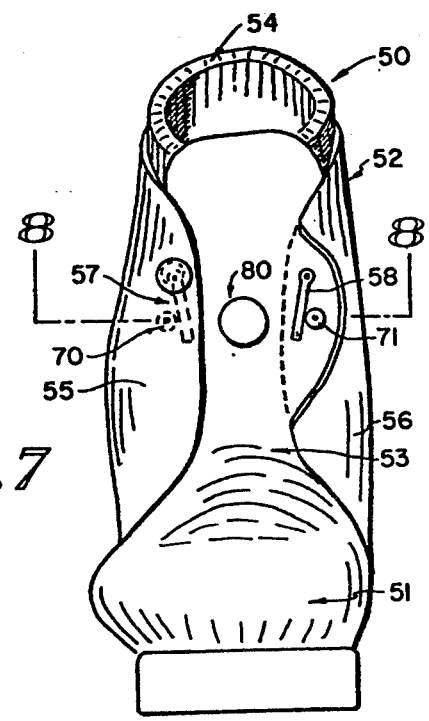
FIG. 7
FIG. 8
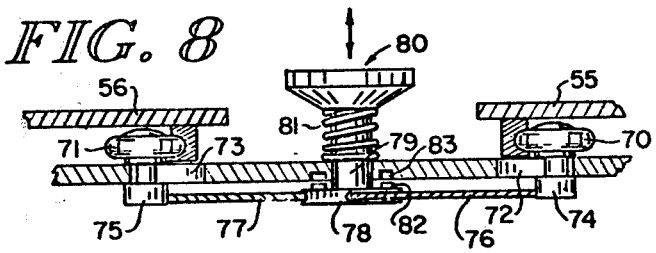
FIG. 9
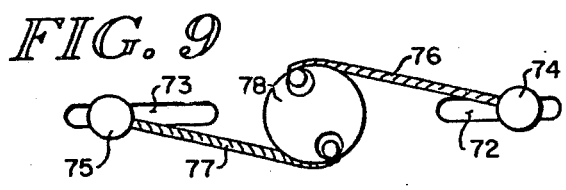

SPORT SHOE WITH A DYNAMIC ADJUSTABLE CUFF ASSEMBLY

RELATED APPLICATIONS

This is a continuation-in-part of applicant's application Ser. No. 886,946, filed Mar. 15, 1978 and applicant's application Ser. No. 50,436, filed June 20, 1979.

BACKGROUND OF THE INVENTION

The present invention relates to fitting systems for sport shoes in general and in particular to a novel internal dynamic fitting system for a ski boot or the like.

A conventional ski boot as presently used in downhill skiing comprises a relatively rigid exterior lower shell member, an upper cuff member and a relatively soft interior liner. The shell member and cuff member are designed to provide mechanical protection and support for a foot, ankle and lower leg and to provide a stable means for releasably securing the ski boot to a ski. Frequently, the shell member and the cuff member are pivotably coupled in the proximity of the ankle. Boots constructed with a pivoting cuff member generally provide restraint against excess sideways and rearward bending at the ankle while providing limited forward bending of the leg relative to the foot. Less commonly, boots are constructed without a pivoting cuff member and forward bending is restricted or accomplished by providing for a separation of the upper forward section of the cuff member.

The relatively rigid exterior lower shell member and upper cuff member in conjunction with the relatively soft interior liner, in addition to providing mechanical support, must also provide a restraint against upward, forward, rearward and sideways movement of the foot. This restraint is desirable to minimize foot discomfort and fatigue from recurring pressure areas and continual movement of the foot in the boot. It is also necessary to control the skis during various skiing maneuvers and in various terrain and snow conditions. Further, it is essential for minimizing foot movement in order to maximize energy transmission between the foot and the release binding in a potential injury-producing fall.

In practice, the magnitude of restraint required from one moment to the next will vary as the skiing conditions and the maneuvers being executed change. Ideally, the boot should provide for a close, though relatively loose, comfortable fit that provides circulation and warmth during the tracking phase of skiing while also providing for at least a momentary tighter fit during the turning phase or other forceful maneuvers of skiing.

Except for the inventions disclosed in applicant's previously filed applications, the design of conventional ski boots generally does not adequately compensate for the dynamic conditions that prevail in downhill skiing. With conventional boots, during a turn when skiing on packed snow, forward bending at the ankle is usually accompanied by a tendency for hindfoot upward movement and forefoot sideways movement because ski control and turning are usually accomplished by downward and sideways force applied to the forward leading edges of the skis. In powder snow, the forward leading edges are kept raised for planing on top of the snow with a tendency for forefoot upward and sideways movement. When maneuvering in snow of different consistencies or in bumpy or mogly terrain, the skier alternates, frequently and rapidly, between forward and rearward bending in the boots. As a result of this movement, ski control is significantly reduced. In most injury-producing fall conditions, excess movement of a foot in a boot also reduces energy transmission between the foot and the release binding.

Because shell molds are expensive to manufacture, it has been the practice to supply a limited number of shell sizes. Manufacturers then rely upon buckles with numerous and complex adjustments and liners of various configurations and constructions to provide a close, comfortable and warm fit, to compensate for innumerable foot sizes and shapes, and to achieve the necessary foot restraint. However, these fitting arrangements are generally unsatisfactory. The use of buckles with numerous and complex adjustments usually results in a nonconforming fit. The buckle closure required to provide a close fit usually results in uncomfortable pressure areas because of the consequent distortion of the relatively rigid shell.

The use of liners of various configurations and constructions also frequently results in a nonconforming fit. Because of the difficulty in supplying liner configurations that will accommodate the wide range of variation of foot sizes and shapes such as a splay or wide forefoot, wide base, angulated heel, halux valgus, boney prominences, spurs, high longitudinal arch or one foot in size variance with the other foot, liners are generally manufactured to conform to only a limited range of size and shape. Manufacturers then rely upon various liner constructions to provide a close comfortable fit. Among the constructions used there are included molded and sheet foam rubber, urethane foam, wax, cork, plastic beads, and other various flow materials. The numerous materials used is indicative of the unsatisfactory results obtained.

In spite of the above fitting arrangements, conventional boots do not provide adequate adjustment for comfort and restraint and a relatively large inventory of many shells and liner configurations and constructions is necessary to satisfy customer requirements. Moreover, a satisfactory fit in the ski shop is still often unsatisfactory on the ski slope because the foot is not necessarily fitted for skiing conditions.

Considering the various possibilities, there are apparently three conventional boot parts that can provide for a dynamic fitting system for a sport shoe in general and a ski boot in particular. They are as follows:

1. A movable cuff as disclosed in both of applicant's previously filed above identified U.S. patent applications and the present application;
2. A movable foot bed as disclosed in applicant's previously filed U.S. patent application Ser. No. 50,436; and
3. A movable tongue assembly as disclosed in the present application.

SUMMARY OF THE INVENTION

In view of the foregoing, a principal object of the present invention is a sport shoe in which there is provided a novel internal dynamic fitting system for changing the fit of the sport shoe to the lower part of a leg in response to movement of the leg relative to a foot attached thereto.

Another object of the present invention is a sport shoe as described above having a cuff member with means for dynamically changing the fit of the cuff member to a leg enclosed thereby in response to the movement of a leg relative to a foot attached thereto.

Another object of the present invention is a sport shoe in which there is provided a cuff means which is movable relative to another part of the sport shoe, a buckle means attached to the cuff means and cable means coupling the buckle means to the sport shoe for tightening the cuff means in response to movement of the cuff means relative to said other part of the sport shoe.

Another object of the present invention is a sport shoe in which there is provided cuff means with cuff flap means, movable tongue means and means for coupling the tongue means to the flap means for pulling the flap means together and tightening the cuff means about a leg enclosed thereby in response to forward movement of the tongue means.

Still another object of the present invention is a sport shoe as described above in which there is provided a cuff means including a pair of flap means, a tongue means, and wedge and pulley means for coupling the tongue means and the flap means whereby forward movement of the tongue means draws the flap means together, tightening the fit of the cuff means about a leg enclosed thereby.

In each of the above described embodiments the tightening and loosening of the cuff means relative to a leg enclosed thereby is provided dynamically in response to movement of a leg relative to a foot attached thereto. The amount of tightening of the cuff means about the leg increases with increasing forward lean and decreases with decreasing forward lean. During normal skiing, maximum forward lean is used principally during turning and forceful maneuvering and minimum lean is used during traversing and other casual skiing maneuvers. Since the amount of tightening of the cuff means relative to a leg enclosed thereby is a function of the magnitude of forward lean, there is a desirable direct relationship to the degree of cuff tightness and the forcefulness of the maneuver being executed.

BRIEF DESCRIPTION OF THE DRAWING

The above and other objects, features and advantages of the present invention will become apparent from the following detailed description of the accompanying drawing in which:

FIG. 3 is a front elevation view of an alternative embodiment according to the present invention.

FIG. 4 is a side elevation view of FIG. 3 with a partial cross-sectional view showing features of the present invention.

FIG. 5 is a cross-sectional view taken along lines 5—5 of FIG. 3.

FIG. 6 is a cross-sectional view taken along lines 6—6 of FIG. 5.

FIG. 7 is a front elevation view of still another embodiment according to the present invention.

FIG. 8 is a partial cross-sectional view taken along lines 8—8 of FIG. 7.

FIG. 9 is a rear view of FIG. 8.

DETAILED DESCRIPTION OF THE DRAWING

Figure 1:
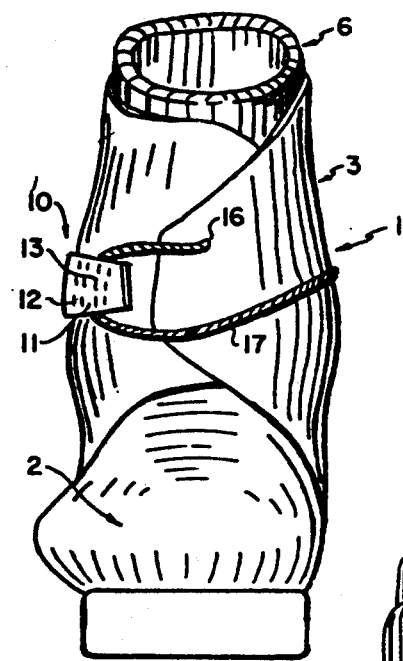
FIG. 1 is a front elevation view of a sport shoe according to the present invention.

Referring to FIG. 1, there is provided in accordance with the present invention a sport shoe in the form of a ski boot designated generally as 1. In the ski boot 1 there is provided a lower shell means designated generally as 2 and an upper cuff means designated generally as 3. The upper cuff means 3 is provided with a right and a left flap means 4 and 5. Interior of the boot there is provided for warmth, comfort and a generally close fit, a liner 6.

Attached to the right flap means 4 there is provided a buckle assembly designated generally as 10. In the buckle assembly 10 there is provided an overcenter lever closing member 11. Interior of the member 11 there is provided a plurality of cable guiding grooves 12 and 13.

Coupled at one end to the left flap means 5 at a point designated 16 there is provided a cable means 17. The cable means 17 is routed from the cuff means attachment point 16 through one of the cable guiding grooves 12, 13 of the buckle assembly 10 across the exterior surface of the flap means 5 toward the rear of the ski boot 1, as shown more clearly in FIG. 2.

Figure 2:
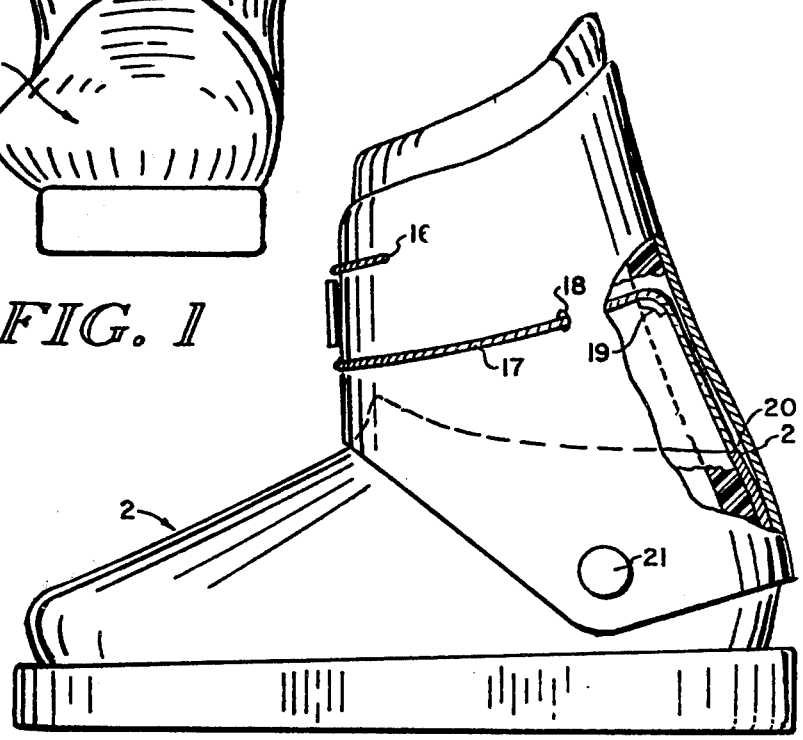
FIG. 2 is a side elevation view of FIG. 1 with a partial cross-sectional view showing features of the present invention.

Referring to FIG. 2, the cable means 17 is routed rearwardly from the buckle assembly 10 through a hole 18 provided therefor in the cuff means 3. From the hole 18 the cable means 17 is routed over a cable guide 19 at the rear spine of the cuff means of the ski boot 1. From the cable guide 19 the cable means 17 is routed along the interior wall of the spine of the cuff means 3 to the upper rear edge of a lower shell member 2 and attached thereto at a point designated generally as 20. The liner 6, which extends generally over the top of the cable means 17 in the interior of the cuff means 3, is shown broken away, but in practice covers the cable 17 and cable guide member 19.

As in many conventional ski boots, the cuff means 3 is movably attached to the lower shell member 2 by a rivet or the like 21.

In use, the buckle assembly 10 is opened by raising the lever member 11 and releasing the cable 17 therefrom. After the flap means 4 and 5 are spread apart, a skier may insert his foot comfortably within the boot 1. After the foot is seated in the boot 1, the cable 17 is fitted in one of the guide grooves 12, 13, depending on the size of the leg enclosed thereby. After the cable 17 is fitted in one of the grooves 12, 13, the lever member 11 is closed to secure the flap means 4 and 5.

After the flap means 4 and 5 are closed, tightening and loosening of the cuff means 3 about a leg enclosed thereby is accomplished by forward and rearward leaning of a leg relative to a foot attached thereto. During forward lean the cable means 17, attached to the upper margin of the rear of the lower shell member 2 is pulled rearwardly relative to the cuff means 3. As the cable means 17 is pulled rearwardly relative to the cuff means 3 during forward lean, the cable means pulls the right flap means 4 using the buckle assembly 10 and the left flap means 5 because of its attachment to the flap means 5 at point 16. As the flap means 4 and 5 are pulled together, the fit of the cuff means 3 relative to a leg enclosed thereby is tightened. With the fit of the cuff means 3 tightened relative to a foot enclosed thereby, heel lifting movement of the foot in the boot is restricted and increased rigidity in the mechanical coupling between the leg and the ski binding to which the ski boot is releasably attached is increased for greater ski control.

Referring to FIGS. 3-6, there is provided in accordance with the present invention another embodiment of a ski boot designated generally as 30. In the ski boot 30 there are many features which are identical to features in the embodiment of FIGS. 1-2. Those features bear the same identifying number as used in FIGS. 1-2.

Referring to FIGS. 3 and 4, there is provided in the ski boot 30 an alternative buckle assembly designated generally as 31. In the buckle assembly 31 there is provided an overcenter lever member 32 and a cable loop bar 33. The cable loop bar 33 is coupled to the lever member 32 by means of a cable loop 34.

Coupled to the buckle assembly 31 and specifically to the cable loop bar 33, there is provided the cable means 17 described above with respect to the embodiment of FIGS. 1 and 2.

As shown more clearly in FIGS. 5 and 6, there is provided extending from the cable loop bar 33 an external buckle post 35. The cable 17 is coupled to the external buckle post 35. For attaching the cable loop bar to the flap means 5, there is provided an inner buckle post slide 36 fitted with a head 37 slidably inserted in a buckle-adjusting slot 38 provided therefor in the flap means 5.

With respect to the remaining features of the ski boot 30, the features are identical to those described above with respect to the features of the embodiments of FIGS. 1-2.

In use, forward lean of the cuff means 3 causes the cable means 17 attached to the upper rear margin of the lower shell 2 to pull on the buckle means 31. As the buckle means 31 is pulled, the flap means 4 and 5 are drawn together. As the flap means 4 and 5 are drawn together, the inner buckle post slide 36 slides in the adjusting slot 38, thereby tightening the fit of the cuff means 3 relative to a leg enclosed thereby.

Referring to FIGS. 7-12, there is provided in accordance with the present invention another embodiment of a ski boot designated generally as 50. In the ski boot 50 there is provided a lower shell member designated generally as 51, an upper cuff member designated generally as 52, a movable tongue member designated generally as 53 and an interior liner 54.

In the cuff means 52 there is provided a right and left cuff flap means 55 and 56. Adjustably mounted to the interior of the cuff means 55 and 56 along the margin thereof there is provided a right and left wedge means designated generally as 57 and 58.

Figure 10:
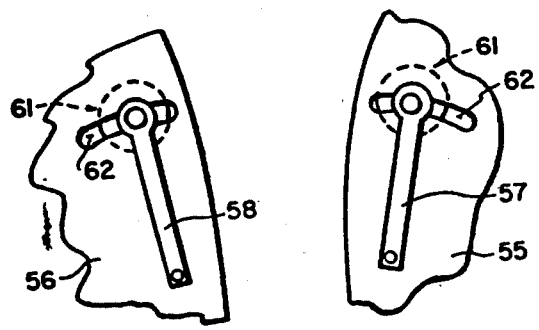
FIG. 10 is an enlarged rear view of wedge members mounted to the interior of cuff flaps according to the present invention.
Figure 11:
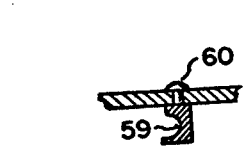
FIG. 11 is a cross-sectional view taken along the lines 11—11 of FIG. 10.
Figure 12:
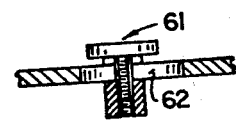
FIG. 12 is a cross-sectional view taken along lines 12—12 of FIG. 10.

As shown in FIGS. 10, 11 and 12, the wedge means 57 and 58 are generally rectangular, elongated members. At the bottom of each of the members, the members are attached to the cuff flap means 55 and 56 by means of a rivet 60 or the like. Along the outer edge thereof, each of the wedge means 57 and 58 are provided with a roller-receiving groove 59, as seen more clearly in FIG. 11. At their upper ends the wedge means 57 and 58 are adjustably connected to the flap means 55 and 56 by means of an adjusting nut 61, adjustably fitted in an adjusting slot 62.

Generally the wedge means 57 and 58 extend outwardly from the bottom thereof. Within the limits of the adjusting slot 62, the position of the upper ends of the wedge means 57 and 58 can be adjusted with the adjusting member 61 for adjusting the angle which the wedge means 57 and 58 make relative to a line parallel to the longitudinal axis of the boot 50.

Referring to FIGS. 7, 8 and 9, movably coupled to the tongue means 53 there is provided a right and left roller means designated generally as 70 and 71 for engaging the roller-receiving groove 59 in the wedge members 57 and 58, respectively.

As seen more clearly in FIGS. 8 and 9, the roller members 70 and 71 are slidably mounted in a pair of adjusting slots 72 and 73, respectively. For preventing the roller members 70 and 71 from pulling through the adjusting slots 72 and 73, the roller members 70 and 71 are fitted, respectively, with a pair of retaining head members 74 and 75, respectively.

Coupled to the head members 74 and 75, there is provided one end of a cable means 76 and 77. The opposite end of the cable means 76 and 77 is coupled to a pulley member 78. The pulley member 78 is coupled to a shaft 79 of an adjusting member designated generally as 80. Fitted around the shaft 79 there is provided a spring 81. In the surface of the pulley member 78 there is provided ratchet-type members 82 for locking the adjusting member 80 in holes 83 provided therefor for preventing involuntary rotation thereof.

To move the roller members 70 and 71 in the slots 72 and 73, the adjusting member 80 is pressed against the force of the spring 81 until the locking means 82 disengages the pulley 78 from holes 83. After the pulley 78 is disengaged, a rotation of the adjusting member 80 will move the roller members 70 and 71 through the action of the cable means 76 and 77 in the slots 72 and 73 for adjusting the relative position of the cuff flap means 55 and 56.

In operation, referring to the embodiment of FIGS. 7-12, dynamic adjustment of the fit of the cuff means 52 relative to a leg enclosed thereby is made in response to a movement of the leg relative to a foot attached thereto. For example, during forward lean, pressure at the upper edge of the tongue means 53 causes the tongue means 53 to pivot forwardly toward the toe of the boot 50. As the tongue means 53 is pivoted towards the toe of the boot 50, the cuff flap means 55 and 56 and the wedge means 57 and 58 attached thereto are forced downwardly. As the cuff flap means 55 and 56 and the wedge means 57 and 58 are forced downwardly, the roller means 70 and 71 attached to the tongue means 53 press inwardly and upwardly in the roller-receiving grooves 59 of the wedge means 57 and 58. As the roller means 70 and 71 press against the wedge means 57 and 58, the wedge means 57 and 58 are pressed inwardly, drawing the cuff flap means 55 and 56 together. As the cuff flap means 55 and 56 are drawn together, the fit of the cuff means 52 is tightened relative to a leg enclosed thereby.

During rearward lean, the reverse action occurs and a relaxation of the pressure on the upper end of the tongue means 53 allows the roller means 70 and 71 to ride downwardly in the groove 59 of the wedge means 57 and 58 thereby permitting the flap means 55 and 56 to move outwardly.

Figure 13:
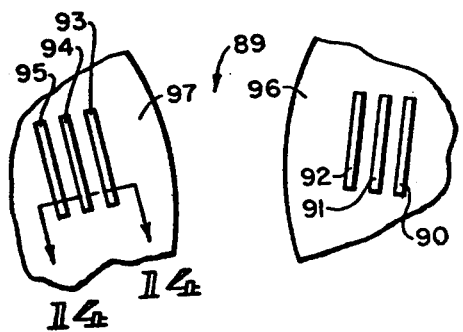
FIG. 13 is a partial elevation view of the inside of ski boot cuff flaps according to another embodiment of the present invention.
Figure 14:
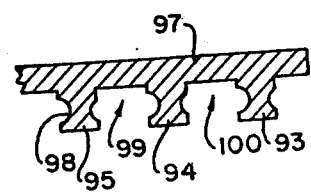
FIG. 14 is an enlarged partial top view of the left flap of FIG. 13.
Figure 15:
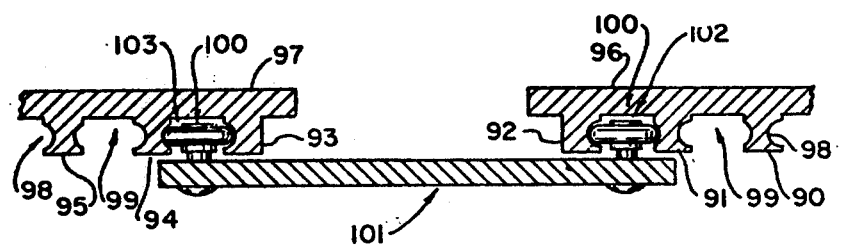
FIG. 15 is an enlarged partial top view of the cuffs of FIG. 13 with an alternative tongue member according to the present invention.

Referring to FIGS. 13, 14 and 15, there is provided in an alternative embodiment of the present invention a ski boot cuff member designated generally as 89 comprising a pair of right and left cuff members 96 and 97 and a tongue member 101.

Mounted to the cuff flap members 96 and 97 there is provided a plurality of wedge members 90, 91, 92, 93, 94 and 95. The wedge members 90, 91 and 92 are mounted on the interior of the right ski boot flap member 96. The members 93, 94 and 95 are mounted on the interior of the left ski boot flap member 97. In the outside edge of the members 90 and 95, there is provided a curved pulley-receiving slot 98. In the interior side of the wedge members 90 and 95 and the exterior side of the wedge members 91 and 94, there is provided a pulley-receiving slot designated as 99. In the interior edge of the wedge members 91 and 94 and the exterior edge of the wedge members 92 and 93 there is provided still another pulley-receiving slot designated generally as 100.

As seen in FIG. 15, there is rotatably mounted on the tongue member 101 a pair of pulley members 102 and 103. The pulley members 102 and 103 are located on the tongue member 101 in substantially the same location as the pulley members 70 and 71 on the tongue member 53, as seen in FIG. 7.

In use, to adjust the fit of the cuff member 89 to a particular leg, the pulley members 102 and 103 are fitted in one of the pulley-receiving slots 98–100. For example, if the pulleys are inserted in the slots designated generally as 100, the fit of the cuff member 89 relative to a leg enclosed thereby is relatively loose. When the pulley members 102 and 103 are inserted in the pulley-receiving slots designated generally as 98, the fit of the cuff member 89 relative to a leg enclosed thereby is tighter. If the pulley members 102 and 103 are inserted in the pulley-receiving slot designated as 99, the fit of the cuff member 89 relative to a leg enclosed thereby is intermediate to the above described fits.

By the provision of the multiple wedge members 90–95 and a selective insertion of the pulley members 102 and 103 in the slots 98–100, the adjusting knob assembly 80 and the associated adjusting parts described above with respect to FIG. 8 may be omitted.

To insert the pulley members 102 and 103 in selected ones of the slots 98–100, the cuff members 96 and 97 are depressed one at a time until the desired pulley member 102 or 103 is able to be inserted in the top of the slot.

Alternatively, suitable adjustable mounting means may be used for mounting the cuff wedge members 90–95 to the cuff flaps 96 and 97. When an adjustable mounting means is used, the wedge members 90–95 may be momentarily separated to permit insertion of the pulley members 102 and 103 therebetween.

It is also apparent that for even a wider range of cuff fits, additional wedge members may be employed, as well as the adjustment features described above with respect to FIGS. 10 and 12.

In practice, the operation of the embodiment described above with respect to FIGS. 13, 14 and 15 is substantially identical to the operation of the embodiment described above with respect to FIGS. 7–12. With the tongue-mounted pulley members 102 and 103, corresponding to the members 70 and 71 of FIG. 8, slidably engaged in one of the pulley-receiving slots 98–100, a forward leaning and pressure at the upper edge of the tongue member 101 will cause the cuff members 96 and 97 to be drawn together and during rearward lean the reverse action will occur. The amount the cuff members 96 and 97 will be drawn together will depend on the particular pulley-receiving slots 98–100 being used.

While several embodiments of a sport shoe according to the present invention are disclosed and described, it is contemplated that many modifications may be made thereto without departing from the spirit and scope of the present invention. Accordingly, it is intended that the description of the enclosed embodiments be used only for purposes of illustrating the present invention and that the scope of the invention be determined solely by reference to the claims hereinafter provided and their equivalents.

What is claimed is:

1. A sport shoe for a lower extremity comprising:
   cuff means for engaging the lower extremity; and
   means responsive to relative movement of the lower extremity and coupled to said cuff means for tightening said cuff means about the lower extremity in response to a relative forward lean of the lower extremity.

2. A sport shoe according to claim 1 wherein said cuff means is movable with respect to another part of said sport shoe and said tightening means comprises means for coupling said cuff means to said other part of said sport shoe.

3. A sport shoe according to claim 2 wherein said cuff means comprises a right and a left flap means, buckle means and means for coupling said buckle means to said right and left flap means; and said coupling means comprises cable means and means coupling said cable means to said buckle means for pulling said right and left flap means toward each other when said cuff means is moved forward with respect to said other part of said sport shoe.

4. A sport shoe according to claim 3 wherein said buckle means comprises an adjusting slot for adjusting the position of said buckle means relative to said right and left flap means as said right and left flap means are pulled together.

5. A sport shoe according to claim 3 wherein said other part of said sport shoe is a lower shell means and said coupling means comprises means for coupling said cable means to a predetermined location on said lower shell means.

6. A sport shoe according to claim 5 wherein said predetermined location for coupling said cable means to said lower shell means is at the upper rear edge of said lower shell means and said coupling means comprises means for guiding said cable means from said upper rear edge of said lower shell means along the spine of said sport shoe for a predetermined distance and then to said buckle means.

7. A sport shoe according to claim 1 wherein said cuff tightening means comprises:
   a movable tongue means movable toward the toe of said sport shoe;
   a wedge means;
   a roller means;
   means for attaching said roller and said wedge means to said tongue and cuff means; and
   means engaging said roller and said wedge means for tightening said cuff means about a leg enclosed thereby as said tongue means is moved toward the toe of said sport shoe.

8. A sport shoe according to claim 7 wherein said cuff means comprises:
- a right and left flap means which overlap right and left portions of said tongue means;
- said wedge means comprises a right and left wedge means mounted on the interior of said right and left flap means; and
- said roller means comprises a right and left roller means mounted to said tongue means for engaging said right and left wedge means.

9. A sport shoe according to claim 8 wherein said right and left wedge means comprise a pair of elongated members, the longitudinal axes of which extend outwardly from the bottom ends thereof.

10. A sport shoe according to claim 9 comprising means for adjusting the position of said right and left wedge means on said right and left flap means.

11. A sport shoe according to claim 10 wherein said wedge-adjusting means comprises means for adjusting the position of at least one end of said wedge means on said right and left flap means.

12. A sport shoe according to claim 8 wherein said roller means comprises means for adjusting the position of said right and left roller means on said tongue means.

13. A sport shoe according to claim 12 wherein said right and left roller-adjusting means comprises:
- a right and left roller position-adjusting means;
- means for mounting said roller position-adjusting means on said tongue means; and
- means for coupling said roller position-adjusting means and said right and left roller means.

14. A sport shoe according to claim 13 wherein said right and left roller-adjusting means comprises a pulley means, said coupling means comprises a cable means, and said pulley means comprises means for moving said pulley means.

15. A sport shoe according to claim 14 wherein said pulley means comprises means for adjusting the length of said cable means between said pulley means and said roller means as said pulley means is moved, and means for releasably locking said pulley means in a predetermined position.

16. A sport shoe for a lower extremity comprising:
- a shell;
- a cuff for engaging the extremity attached to the shell for movement in first and second directions with respect to the shell and defined by first and second, relatively movable parts; and
- means coupled with the parts and the shell for moving the parts towards each other in response to movement of the cuff with respect to the shell in the first direction;
- whereby the tightness with which the parts engage the lower extremity is increased when the cuff is moved in the first direction.

17. A sport shoe according to claim 16 wherein the moving means permits movement of the parts away from each other when the cuff if moved in the second direction.

18. A sport according to claim 16 wherein the moving means comprises a cable having a cable portion extending from the parts to the shell, the cable portion including a strand proximate the parts, and including means orienting the strand in the direction of relative movement of the parts.

19. A sport shoe according to claim 18 wherein the means for orienting arranges the strand substantially parallel to the relative movement between the parts.

* * * * *